(12) United States Patent
Nozaki et al.

(10) Patent No.: US 8,488,022 B2
(45) Date of Patent: Jul. 16, 2013

(54) ELECTRONIC CAMERA

(75) Inventors: Hirotake Nozaki, Kawasaki (JP);
Satoshi Ejima, Tokyo (JP)

(73) Assignee: Nikon Corporation, Tokyo (JP)

( * ) Notice: Subject to any disclaimer, the term of this patent is extended or adjusted under 35 U.S.C. 154(b) by 122 days.

(21) Appl. No.: 13/080,056

(22) Filed: Apr. 5, 2011

(65) Prior Publication Data
US 2011/0181742 A1    Jul. 28, 2011

Related U.S. Application Data

(60) Continuation of application No. 12/839,763, filed on Jul. 20, 2010, now abandoned, and a continuation of application No. 11/349,975, filed on Feb. 9, 2006, now abandoned, and a division of application No. 09/149,001, filed on Sep. 8, 1998, now Pat. No. 7,027,087.

(30) Foreign Application Priority Data

Aug. 21, 1998  (JP) ..................................... 10-236102

(51) Int. Cl.
*H04N 5/76* (2006.01)
*H04N 5/232* (2006.01)

(52) U.S. Cl.
USPC ........................................ 348/231.99; 348/354

(58) Field of Classification Search
None
See application file for complete search history.

(56) References Cited

U.S. PATENT DOCUMENTS

| | | |
|---|---|---|
| 4,774,538 A | 9/1988 | Kawai |
| 4,809,076 A | 2/1989 | Todaka et al. |
| 5,043,816 A | 8/1991 | Nakano et al. |
| 5,053,875 A | 10/1991 | Ishii et al. |
| 5,060,007 A | 10/1991 | Egawa |
| 5,111,306 A | 5/1992 | Kanno et al. |
| 5,192,964 A * | 3/1993 | Shinohara et al. ............... 396/55 |
| 5,291,300 A * | 3/1994 | Ueda ............................. 386/327 |
| 5,335,032 A | 8/1994 | Onuki et al. |
| 5,359,382 A | 10/1994 | Uenaka |
| 5,359,676 A | 10/1994 | Fan |
| 5,479,211 A | 12/1995 | Fukuda |
| 5,594,554 A | 1/1997 | Parkash et al. |
| 5,842,059 A | 11/1998 | Suda |

(Continued)

FOREIGN PATENT DOCUMENTS

| | | |
|---|---|---|
| JP | A-03-036886 | 2/1991 |
| JP | A-03-198482 | 8/1991 |
| JP | A-04-220879 | 8/1992 |
| JP | A-04-343579 | 11/1992 |
| JP | A-05-137053 | 6/1993 |
| JP | A 11-136557 | 5/1999 |

*Primary Examiner* — Luong T Nguyen
(74) *Attorney, Agent, or Firm* — Oliff & Berridge, PLC

(57) ABSTRACT

The present invention relates to an electronic camera which images an object image and records image data. Particularly, the present invention relates to technology to record image data in a good shooting state, such as with little blurring due to hand shaking. The invention has an image pick-up means which continuously images an object, a temporary memory means which temporarily stores a plurality of frames of image data which are continuously imaged by the image pick-up means, a shooting evaluation means which evaluates a good or bad shooting state of the image data imaged by the image pick-up means, a still image selection means which selects the image data with the highest evaluation of the shooting evaluation means among the image data which are stored in the temporary memory means, and an image saving means which saves the image data which is selected by the still image selection means.

7 Claims, 12 Drawing Sheets

U.S. PATENT DOCUMENTS

| | | |
|---|---|---|
| 5,920,349 A | 7/1999 | Okino et al. |
| 6,046,768 A | 4/2000 | Kaneda et al. |
| 6,091,448 A | 7/2000 | Washisu et al. |
| 6,125,201 A | 9/2000 | Zador |
| 6,147,708 A | 11/2000 | Suzuki et al. |
| 6,344,876 B2 | 2/2002 | Shiomi |
| 6,415,057 B1 | 7/2002 | Suzuki et al. |
| 6,486,910 B1 * | 11/2002 | Kaneda et al. ........... 348/208.99 |
| 6,697,529 B2 | 2/2004 | Kuniba |
| 6,704,501 B1 | 3/2004 | Washisu |
| 2005/0219666 A1 | 10/2005 | Ejima et al. |

* cited by examiner

ELECTRONIC CAMERA

This is a Continuation of U.S. patent application Ser. No. 12/839,763 filed Jul. 20, 2010, which in turn is a Continuation of U.S. patent application Ser. No. 11/349,975 filed Feb. 9, 2006, which in turn is a Division of U.S. patent application Ser. No. 09/149,001 filed Sep. 8, 1998, which claims priority to Japanese Patent Application No. 10-236102 filed Aug. 21, 1998. The disclosure of the prior applications are hereby incorporated by reference herein in their entirety.

BACKGROUND OF THE INVENTION

1. Field of the Invention

The present invention relates to an electronic camera which photographs an object and records image data. In particular, the present invention relates to a technology for recording image data in a good shooting condition without hand shaking or the like.

2. Description of the Related Art

Generally, when performing hand-held camera shooting, hand shaking often occurs. When this kind of hand shaking occurs, since an object field is exposed in a blurry condition, an entirely blurry image is shot.

In a blurry image like this, the details of the entire image and the edge portions, which should be shot clearly, are lost. Therefore, the image does not give a good impression.

A conventional camera with a hand shaking correction mechanism for solving these disadvantages due to hand shaking is well known.

FIG. 13 shows a camera with this kind of hand shaking correction mechanism.

In FIG. 13, a shooting lens 92 is disposed on the front face of the camera 91. A blur correction optical system 93 is rotatably arranged in the lens barrel of the shooting lens 92.

The rotation of two-axis coreless motors 94 and 95 is transmitted to this blur correction optical system 93, causing it to vibrate vertically and horizontally.

Meanwhile, a blur amount detecting sensor 96 which detects the blur amount in the horizontal direction and a blur amount detecting sensor 97 which detects the blur amount in the vertical direction are arranged in the camera 91.

In the camera 91 which has this kind of structure, vibration of the camera body is detected by using the blur amount detecting sensors 96 and 97. The camera 91 drives the coreless motors 94 and 95 in the reverse direction of the detected vibration, and vibrates the optical axis of the blur correction optical system 93. As a result, the vibration of the shooting optical axis is diminished, and a good photograph in which the hand shaking is corrected can be shot.

However, in this kind of conventional example, the blur correction optical system 93 is disposed in the shooting lens 92. Therefore, there is a problem in that the shooting lens 92 becomes large and heavy.

Moreover, the space to arrange the blur correction optical system 93 has to be kept in the shooting lens 92, and there is a problem in that the flexibility of design of the shooting lens 92 decreases.

Furthermore, the inner reflection in the shooting lens 92 increases for the portion where the blur correction optical system 93 is provided. Therefore, flaring easily occurs when performing back-lit shooting or the like.

Moreover, since electric power is consumed when driving the blur correction optical system 93, there is a problem in that the battery life becomes shorter.

Furthermore, there is a problem in that a small amount of noise occurs when driving the blur correction optical system 93.

On the other hand, a blurred image can occur due not only to the aforementioned hand shaking, but also due to object shifting and misfocusing. However, since the conventional hand shaking correction mechanism only diminishes the vibration of the camera, there is a problem in that the mechanism cannot prevent object shifting and misfocusing at all.

In particular, along with the trend toward higher resolution and miniaturization of imaging elements in recent years, the light receiving area per one pixel is more and more reduced, and the effective sensitivity of the imaging element has become low. Because of this, there is a tendency that the exposure time of the shooting element generally increases, and the chances of occurrence of hand shaking and object shifting become even higher. Because of this, especially in an electronic camera, immediate countermeasures are desired with respect to hand shaking and object shifting.

Moreover, it was very difficult to accurately prevent misfocus accurately with conventional AF (automatic focus) shooting for an object which shows unpredictable movements, such as a flower which is swaying in the wind. Because of this, an electronic camera which can accurately resolve the misfocus accurately under this adverse conditions is strongly desired.

SUMMARY OF THE INVENTION

The present invention, in order to solve the aforementioned problems, has a purpose of providing an electronic camera which can reliably obtain image data in a good shooting condition, an electronic camera which can achieve minimum electric power consumption, an electronic camera which can decrease the worst value of release time lag by approximately one half, an electronic camera with a simplified structure, and an electronic camera which can decrease the memory capacity of the temporary storing means (later mentioned) or can increase the number of the samplings of image data.

Moreover, another purpose of the invention is to provide an electronic camera which can omit the temporary storing means (later mentioned), an electronic camera which can obtain good image data with little hand shaking, an electronic camera which can obtain good image data which has little object shifting or misfocus, an electronic camera which can effectively perform analysis of a spatial frequency component, and an electronic camera which can obtain good image data with little release time lag.

DESCRIPTION OF THE PREFERRED EMBODIMENTS

Figure 1:
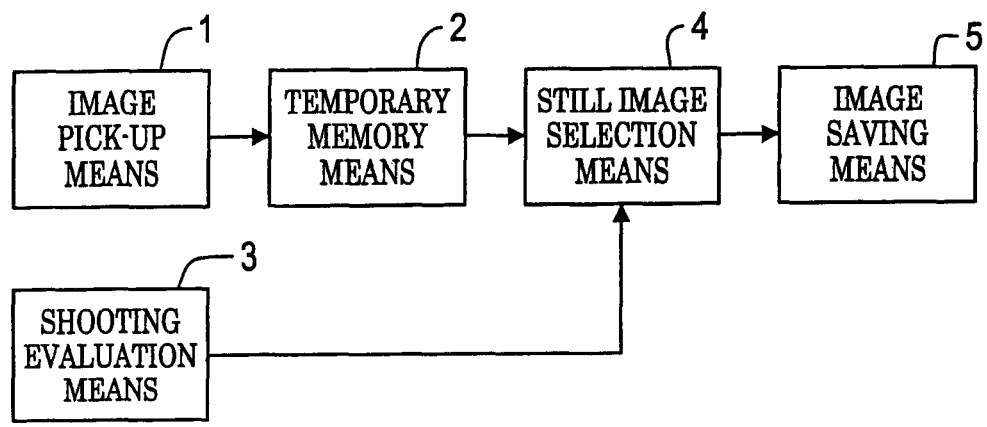
FIG. 1 is a principal block diagram which explains the invention.

FIG. 1 is a schematic block diagram that explains the invention.

The invention comprises an image pick-up means 1 which continuously images an object, a temporary memory means 2 which temporarily stores a plurality of image data that are continuously imaged by the image pick-up means 1, a shooting evaluation means 3 which evaluates whether the shooting condition of the image data which is imaged by the image pick-up means 1 is good or bad, a still image selection means 4 which selects image data with the highest evaluation by the shooting evaluation means 3, and an image saving means 5 which saves the image data which is selected by the still image selection means 4.

In the electronic camera, the temporarily memory means 2 starts the temporary storing of the image data after the release operation of the electronic camera is performed.

Moreover, while waiting for the release operation, the temporary memory means 2 successively takes in new image data from the image pick-up means 1 and successively updates the image data that is being temporarily stored, and after the release operation of the electronic camera, suspends the data updating when the image data spanning from before to after the release operation has been temporarily stored.

The temporary memory means 2 and the image saving means 5 share the same memory mechanism.

The temporary memory means 2 performs differential compression and stores a plurality of image data that is continuously imaged by the image pick-up means 1.

Figure 2:
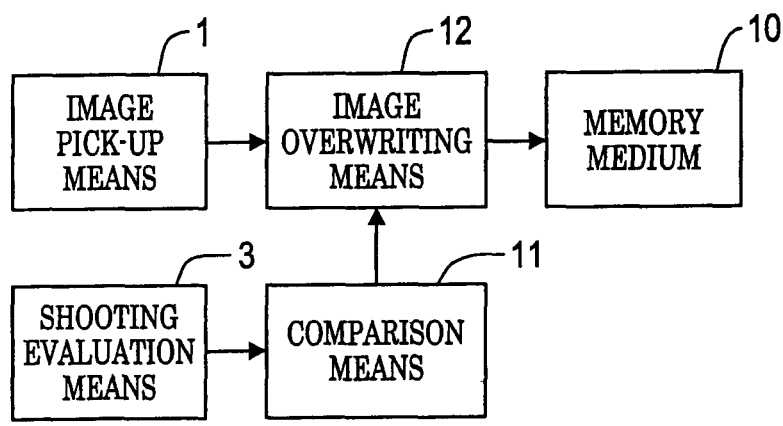
FIG. 2 is a principal block diagram which explains another aspect of the invention.

FIG. 2 is a schematic block diagram to explain another aspect of the invention.

Another aspect of the invention comprises the image pick-up means, that continuously images an object, a memory medium 10 which can store the image data, a shooting evaluation means 3 that evaluates whether the shooting condition of the individual image data imaged by the image pick-up means 1 is good or bad, a comparison means 11 which compares the evaluation of the shooting evaluation means 3 concerning the image data in the memory medium 10 and the evaluation of the shooting evaluation means 3 concerning new image data from the image pick-up means 1, and an image overwriting means 12 which overwrites and records the new image data to the memory medium 10 when the evaluation of the new image data by the comparison of the comparison means 11 is high.

This shooting evaluation means 3 is a means for detecting the blur amount of the image pick-up means 1 as at least one of a good shooting condition or a bad shooting condition.

In particular, the shooting evaluation means 3 evaluates the spatial frequency component of the image data as at least one of a good shooting condition and a bad shooting condition.

Furthermore, the shooting evaluation means 3 evaluates the high area component amount of the spatial frequency based on the compression encoding amount of the image data.

The shooting evaluation means 3 evaluates the release time lag which is the time shift between the release operation of the electronic camera and the point of imaging the image data.

[Explanation of the Operation of FIG. 1]

In the electronic camera of FIG. 1, the image pick-up means 1 continuously images an object. A plurality of image data that are shot in the same manner are temporarily stored in the temporary memory means 2.

Meanwhile, the shooting evaluation means 3 evaluates whether the shooting condition of the individual image data is good or bad. The still image selection means 4 selects the image data which is imaged during the period when the evaluation of the shooting condition is highest among the image data that are stored in the temporary memory means 2. The image saving means 5 saves the selected image data.

According to the aforementioned operation, the electronic camera can selectively obtain image data of a good shooting condition.

Moreover, in particular, in this electronic camera, the temporary memory means 2 temporarily stores the image data during the shooting period. Accordingly, since it is sufficient to perform the selecting processing of the image data after the shooting is completed, the processing operation during the shooting period can be decreased without any trouble.

In the electronic camera, the temporary memory means 2 starts the temporary storing of the image data after the release operation of the electronic camera.

Accordingly, image data of a good shooting condition can be selected from among the image data that is imaged after the release operation.

With this kind of operation, the operation may start after the release operation, and it is not necessary to always perform the imaging operation. Accordingly, it is possible to minimize electric power consumption of the electronic camera.

In the electronic camera, the temporary memory means 2 takes the new image data from the image pick-up means 1 successively while waiting for the release operation.

The temporary memory means 2 updates the image data by using this new image data, and maintains a plurality of image data that are temporarily stored in the nearest condition.

When the electronic camera is release-operated in this condition, the temporary memory means 2 suspends the data updating when the image data spanning from before to after the release operation has been temporarily stored.

Through this operation, the sampling zone (interval) of the image data which remains in the temporary memory means 2 is the zone which spans from before to after the release operation.

In particular, hand shaking that accompanies the release operation hardly ever occurs right before the release operation. Because of this, the possibility of selecting image data which has fewer hand shakings becomes very high by adding the period of right before the release operation to the sample zone.

In addition, since the sample zone of the image data spans from before to after the release operation, the worst value of the release time lag (corresponding to the time interval between the edge point of the sample zone and the release operation point) decreases by approximately half compared to when a sample zone of the same time length is arranged only after the release operation.

In the electronic camera, the temporary memory means 2 and the image saving means 5 share the same memory mechanism. Accordingly, the structure of the electronic camera is simplified.

In the electronic camera, the temporary memory means 2 performs differential compression to the image data which is continuously imaged by the image pick-up means 1 and stores the image data. The differential compression is compression by obtaining differential data between images and, for example, includes the techniques of simple differential compression between frames, movement guarantee prediction or the like. Normally, image data which is continuously imaged by the image pick-up means 1 has a very high correlation, even though it is not as high as the frame correlation of an animated image. Accordingly, it is possible to make the encoding amount of the image data smaller by performing the above mentioned differential compression.

Accordingly, it is possible to increase the sample number of the image data which can be stored in the temporary memory means 2. The possibility of selecting image data which has a better shooting condition becomes high by thus increasing the sample number of the image data.

Moreover, if the sample number of image data is not increased, it is possible to decrease the memory capacity of the temporary memory means 2.

[Explanation of the Operation of FIG. 2]

In the electronic camera of FIG. 2, the image pick-up means 1 continuously images an object. At this time, the shooting evaluation means 3 evaluates whether the shooting condition is good or bad. The comparing means 11 compares the evaluation concerning image data in the memory medium 10 and the new evaluation concerning new image data from the image pick-up means 1.

Here, when the new evaluation is higher, the image overwriting means 12 overwrites and records the new image data to the memory medium 10. As a result, the image data of the better shooting condition remains in the memory medium 10.

In particular, in this electronic camera, it is not necessary to temporarily store the entire series of image data, and a large capacity of temporary memory means becomes unnecessary.

The electronic camera detects the blur amount (vibration amount or angular speed) of the image pick-up means 1 for the good or bad evaluation of the shooting condition. It can be evaluated that the hand shaking is small and the shooting condition is good when the blur amount of the image pick-up means 1 is small.

Accordingly, it is possible to image the image data with less hand shaking by performing the good or bad evaluation of the shooting condition by using the blur amount of the image pick-up means 1 as the measurement.

The electronic camera uses the spatial frequency component of the image data as the measurement of the good or bad evaluation of the shooting condition. Normally, for image data that are continuously imaged the image itself does not change much and it is assumed that the distribution of the spatial frequency has virtually no change. However, when hand shaking, object shifting or misfocus occurs to these image data, the image data is flattened and spatial frequency components of the high area is lost.

Accordingly, it can be evaluated that image data which has many spatial frequency components of high area among these image data has less hand shaking, object shifting or misfocus as a whole, and that the shooting condition is better.

Accordingly, it is possible to accurately select the image data which has small hand shaking, object shifting and misfocus as a whole by performing the good or bad evaluation of the shooting condition by using the spatial frequency component of the image data as the measurement.

The electronic camera evaluates the spatial frequency component of the image data from the compressed encoding amount. Normally, it can be evaluated that when the compressed encoding amount is larger, the spatial frequency component of the high area is larger. Accordingly, image data among the image data that are continuously imaged which has a large compressed encoding amount has less hand shaking, object shifting, and misfocus as a whole, and it can be evaluated that the shooting condition is better. Moreover, the value of this kind of compressed encoding amount can be obtained from the result of prior image compression processing, and it is not necessary to add special processing.

The electronic camera detects the release time lag as at least one of a good evaluation and a bad evaluation of the shooting condition. When this release time lag is smaller, it is closer to the shutter timing which the user desires, and it can be evaluated that the shooting condition is better. Accordingly, it is possible to select image data which has a smaller release time lag by making the release time lag as one item of the good or bad evaluation.

Moreover, in particular, the case is explained in which image data which has smaller release time lag is selected in a condition of performing the temporary storing of the imaged image from before the release operation. In this case, it is possible that the camera is in the middle of an exposure operation at the moment of the release operation. Accordingly, it is possible to obtain an image which has completely zero release time lag, which could not be obtained with conventional single shooting of an electronic camera, by automatic image selection.

Moreover, in the above description, the good or bad evaluation is performed by only one evaluation item for convenience. However, the present invention is not limited to this.

The good or bad evaluation can be performed by providing a priority order in the plurality of evaluation items, or by performing a total evaluation by weighting the evaluation items. At this time, needless to say, it is acceptable when other evaluation items are included.

Moreover, the electronic camera of the above-mentioned FIGS. 1 and 2 is not narrowly limited to a single structure electronic camera. There is a trend in recent electronic cameras to structure them as a plurality of mechanical systems, such as by having separate structures for the shooting unit and the information mechanism. (Computer, electronic notebook or the like). In this kind of system structure, it is possible to divide the operations of the present invention appropriately between a plurality of machines.

For example, it is possible to divide the operations, such as (1) in the imaging unit side, the continuously shot image data is temporarily stored and (2) in the information mechanism side, the images are selected and saved from among the series of image data according to the good or bad evaluation of the shooting condition.

Moreover, the operation of the information mechanism in this case can be realized by using a program (recorded on a machine readable recording medium) which makes the information mechanism execute "a step of obtaining a result of a good or bad evaluation from the image pick-up unit or performing a good or bad evaluation of the shooting condition from the spatial frequency component of the image data or the like" and "a step of selecting and saving image data according to the result of the good or bad evaluation".

EMBODIMENTS

Hereafter, the embodiments of the present invention are explained based on the drawings.

First Embodiment

Figure 3:
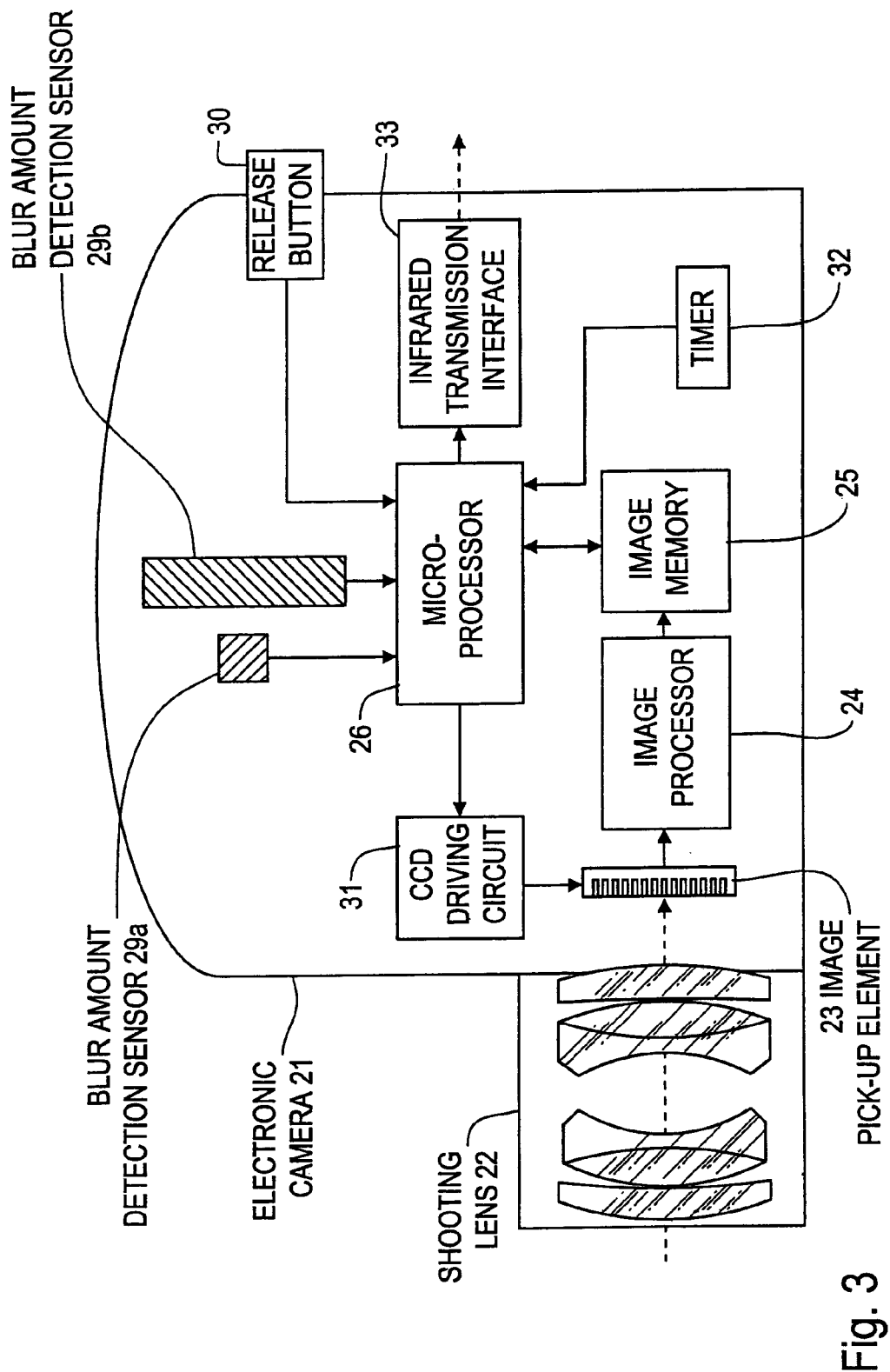
FIG. 3 is a block diagram which shows the first embodiment.

FIG. 3 is a block diagram which shows the first embodiment.

In FIG. 3, a shooting lens 22 is provided at the front face of the electronic camera 21. The light receiving face of an image pick-up element 23 is arranged on the image space side of the shooting lens 22.

The image output of this image pick-up element 23 is directly stored in the image memory 25 via an image processor 24 which performs color signal processing, A/D conversion, γ correction, image compression and the like. Other than this, in the image memory 25, reading and writing of the data are performed via the data bus of the microprocessor 26.

Moreover, blur amount detecting sensors 29a and 29b that are made of an angular speed sensor such as a piezoelectric gyro are arranged within the case of the electronic camera 21. The blur amount detecting sensor 29a detects the blur amount in the vertical direction (pitching). The other blur amount detecting sensor 29b detects the blur amount in the horizontal direction (yawing). Output terminals of these blur amount detecting sensors 29a and 29b are respectively connected to the A/D input terminal of the microprocessor 26.

Moreover, on the top face of the case of the electronic camera 21, a release button 30 is arranged. The switch output of the release button 30 is connected to the microprocessor 26.

Moreover, an electronic shutter control signal from the microprocessor 26 is given to the CCD driving circuit 31. The CCD driving circuit 31 forms a driving pulse corresponding to this control signal, and gives it to the image pick-up element 23. In addition, a timer 32 and an infrared ray transmission interface 33 are connected to the microprocessor 26.

Moreover, the corresponding relationships of the present invention and the first embodiment are as follows. Image pick-up means 1 corresponds to the image pick-up element 23 and the CCD driving circuit 31. The temporary memory means 2 corresponds to the image memory 25 and "a function which differentially compresses and temporarily stores image data" of the image processor 24. The shooting evaluation means 3 corresponds to the blur amount detecting sensors 29a and 29b. The still image selection means 4 corresponds to "a function which selects image data based on the blur amount" of the microprocessor 26. The image saving means 5 corresponds to the image memory 25 and "a function which saves the selected image data" of the microprocessor 26.

Next, the operation of the first embodiment is explained.

Figure 4:
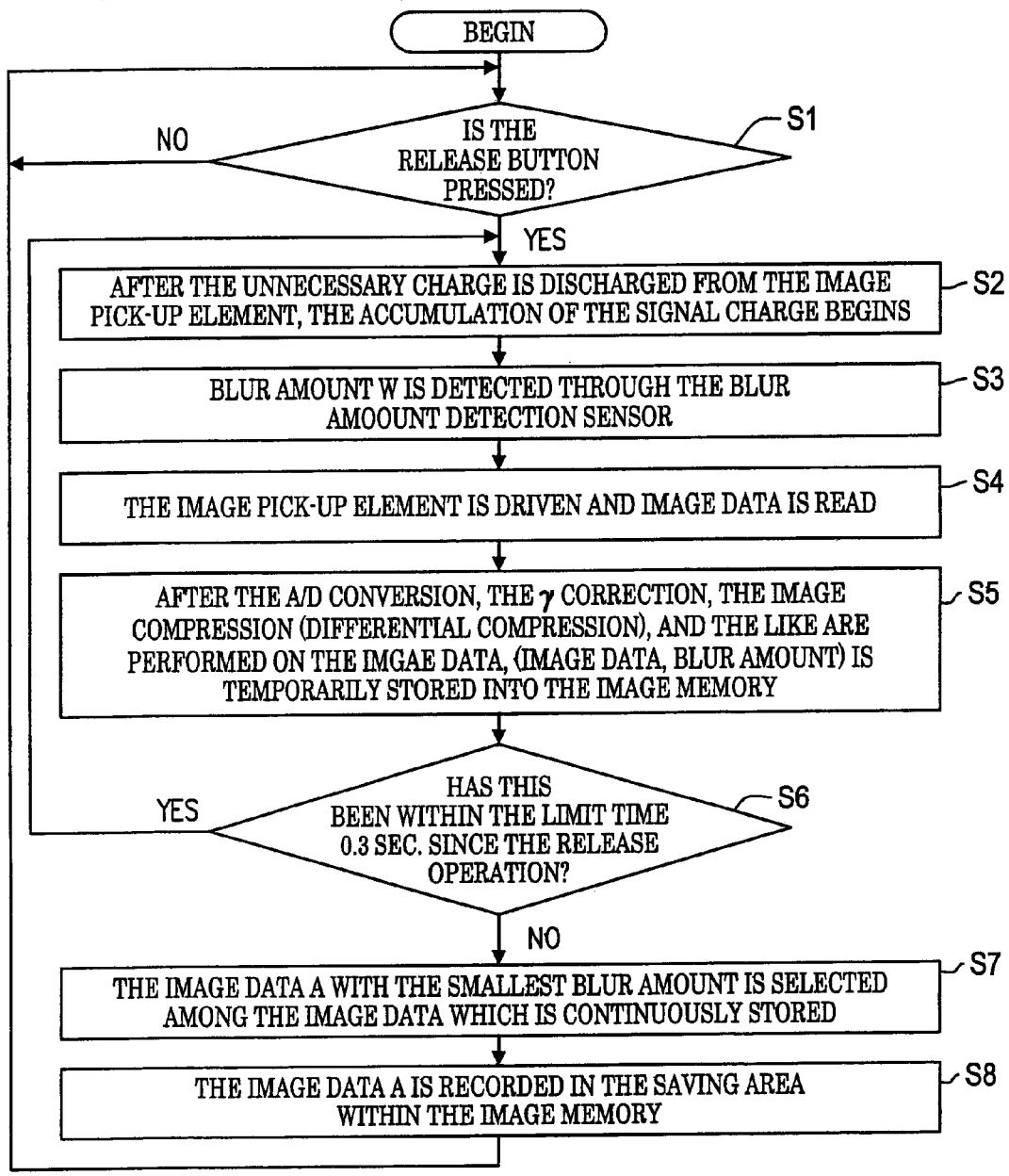
FIG. 4 is a flowchart which explains the operation of the first embodiment.

FIG. 4 is a flowchart to explain the operation of the first embodiment.

First of all, when the main power of the electronic camera 21 is turned on, the microprocessor 26 waits until the release button 30 is pressed (NO side of S1 of FIG. 4).

Here, when the release button 30 is pressed (YES side of S1 of FIG. 4), the microprocessor 26 activates the CCD driving circuit 31, and temporarily discharges the unnecessary charge on the image pick-up element 23. After discharging the unnecessary charge, a signal charge is newly accumulated on the image pick-up element 23 corresponding to the brightness of an object which is projected to the light receiving face (S2 of FIG. 4).

During the accumulating period of this kind of signal charge, the microprocessor 26 takes in a blur amount W1 in the vertical direction from the blur amount detecting sensor 29a. A blur amount W2 in the horizontal direction is obtained from the other blur amount detecting sensor 29b. The microprocessor 26 calculates the sum of the squares or the sum of the absolute values of the blur amounts W1 and W2, and takes this value as the blur amount W of the entire electronic camera 21 (S3 of FIG. 4).

When a predetermined accumulation time passes, the microprocessor 26 reads out the image data from the image pick-up element 23 via the CCD driving circuit 31 (S4 of FIG. 4).

The image processor 24 records this image data in a temporary memory area of the image memory 25 after performing A/D conversion, γ correction, image compression and the like. Moreover, for the image compression here, differential compression is adopted which is the same as in MPEG or the like. Moreover, at this time, the microprocessor 26 records the blur amount W relating to the image data (S5 of FIG. 4).

The above mentioned series of operations S2-S5 are repeatedly executed until a limited time of 0.3 seconds elapses from the release operation (YES side of S6 of FIG. 4).

Through the operation until this point, image data of a plurality frames that are imaged during the 0.3 seconds from the release operation are recorded in the image memory 25 along with the blur amount W during the shooting period.

The microprocessor 26 searches for the smallest value among the blur amounts W, and finds image data A which was imaged during the period for which the smallest blur amount W is detected (S7 of FIG. 4).

Figure 5:
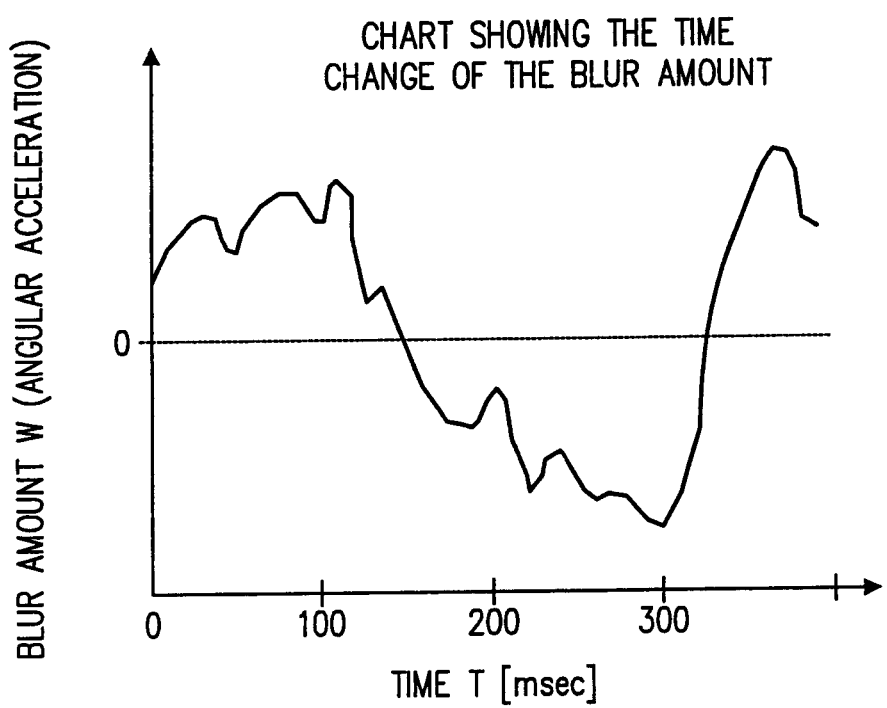
FIG. 5 is a figure which shows the time change of the blur amount.

FIG. 5 is a diagram which shows the condition of the time change and overall blur amount W. According to FIG. 5, it can be expected that the blur amount W becomes smallest approximately once for every 0.3 seconds. Accordingly, the image data A which is selected as described above has sufficiently small hand shaking and it is predicted that it is good image data.

The microprocessor 26 records this image data A in the saving area of the image memory 25 (S8 of FIG. 4). Moreover, it is acceptable to finish the processing of the image data A by performing a change of the management area, the image memory 25 and the file attributes without actually shifting the image data A in the image memory 25. Moreover, when the image data A is differentially compressed, it may be newly JPEG compressed after being image decompressed.

By the operation explained above, in the first embodiment, the image data which has the smallest blur amount W among the image data that are continuously imaged is selected. Accordingly, it is possible to obtain image data which has small hand shaking without using a conventional hand shaking correction mechanism at all.

Moreover, since it is not necessary to arrange an optical system for the hand shaking correction in the shooting lens 22, a compact lightweight shooting lens 22 can be easily obtained.

In addition, because there is no need to maintain space in order to arrange the optical system for hand shaking correction in the shooting lens 22, the degree of design freedom of the shooting lens 22 becomes higher. Because of this, it has become possible to improve the operationability of the shooting lens 22 without having any problems.

Moreover, since the inner reflection by the optical system for the hand shaking correction is resolved, flaring at the time of performing backlight shooting is decreased.

In addition, since there is no need to have a driving mechanism for the hand shaking correction, it is possible to extend the battery life to conserve the electric power consumption.

Moreover, the disadvantages of occurrence of noise or vibration from the driving mechanism for the hand shaking correction are resolved.

Moreover, since the image memory 25 is jointly used for both the temporary storing and saving of the image data, there is no need to provide the image memory separately, and the structure of the electronic camera 21 can be simplified.

Moreover, in the above mentioned embodiment, the memory area of the image memory 25 is fixedly divided into the temporary memory area and the saving area, but the present invention is not limited to this. For example, it is acceptable to movably divide the temporary memory area of the image memory 25. With this kind of structure, it becomes possible to save the image data by using the entire memory area of the image memory 25 by dividing the temporary memory area into the saving area gradually.

Next, another embodiment is explained.

Second Embodiment

Figure 6:
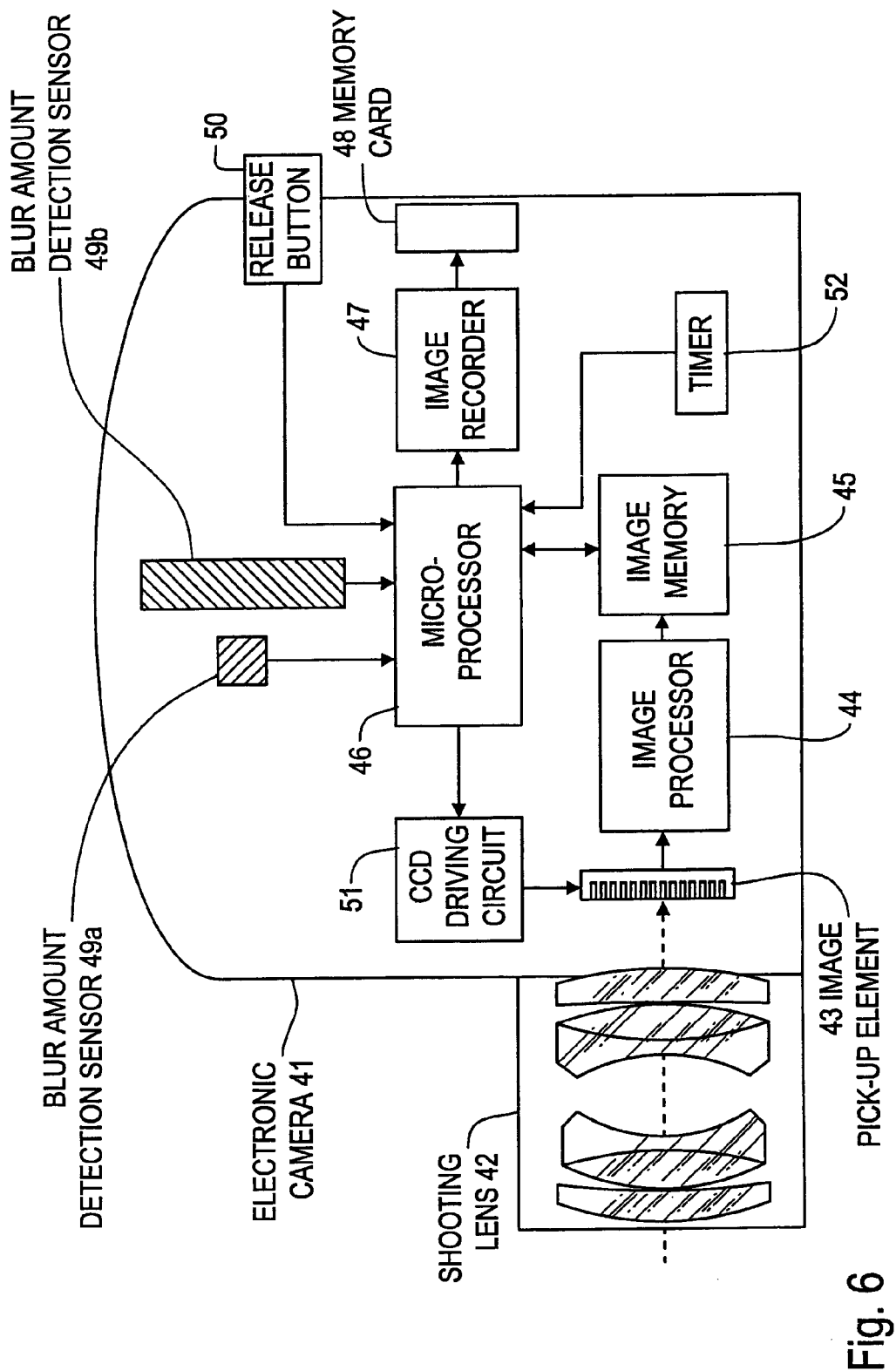
FIG. 6 is a block diagram which shows the second embodiment.

FIG. 6 is a block diagram which shows the second embodiment.

In FIG. 6, a shooting lens 42 is provided on a front face of the electronic camera 41. The light receiving face of an image pick-up element 43 is arranged on the image space side of the shooting lens 42.

The image output from the image pick-up element 43 is connected to the data input of the image memory 45 via the image processor 44 which performs color signal processing, A/D conversion, γ correction and the like. Meanwhile, the data output of the image memory 45 is connected to the data input of the microprocessor 46.

A memory card 48 is detachably connected to the data output terminal of the microprocessor 46 via the image recording part 47.

Meanwhile, blur amount detecting sensors 49a and 49b that are composed of an angular speed sensor such as a piezoelectric gyro are arranged within the case of the electronic camera 41. The outputs of these blur amount detecting sensors 49a and 49b are respectively connected to A/D input terminals of the microprocessor 46.

Furthermore, a release button 50 is arranged on the top face of the case of the electronic camera 41, and the switch output of the release button 50 is connected to the microprocessor 46.

An electronic shutter control signal from the microprocessor 46 is given to the CCD driving circuit 51. The CCD driving circuit 51 generates a driving pulse in response to this control signal, and forwards it to the image pick-up element 43. Other than this, a timer 52 is connected to the microprocessor 46.

The corresponding relationships of the present invention and second embodiment are as follows. The imaging means 1 corresponds to the image pick-up element 43 and the CCD driving circuit 51, the temporary memory means 2 corresponds to the image memory 45 and "a function that temporarily stores the image data spanning from before to after the release operation" of the image processor 44, the shooting evaluation means 3 corresponds to the blur amount detecting sensors 49a and 49b and "a function which measures the release time lag" of the timer 52 and the microprocessor 46, the still image selection means 4 corresponds to "a function which selects the image data based on an evaluation value" of the microprocessor 46, and the image saving means 5 corresponds to the image recording part 47 and the memory card 48.

Next, the operation of the second embodiment is explained.

Figure 7:
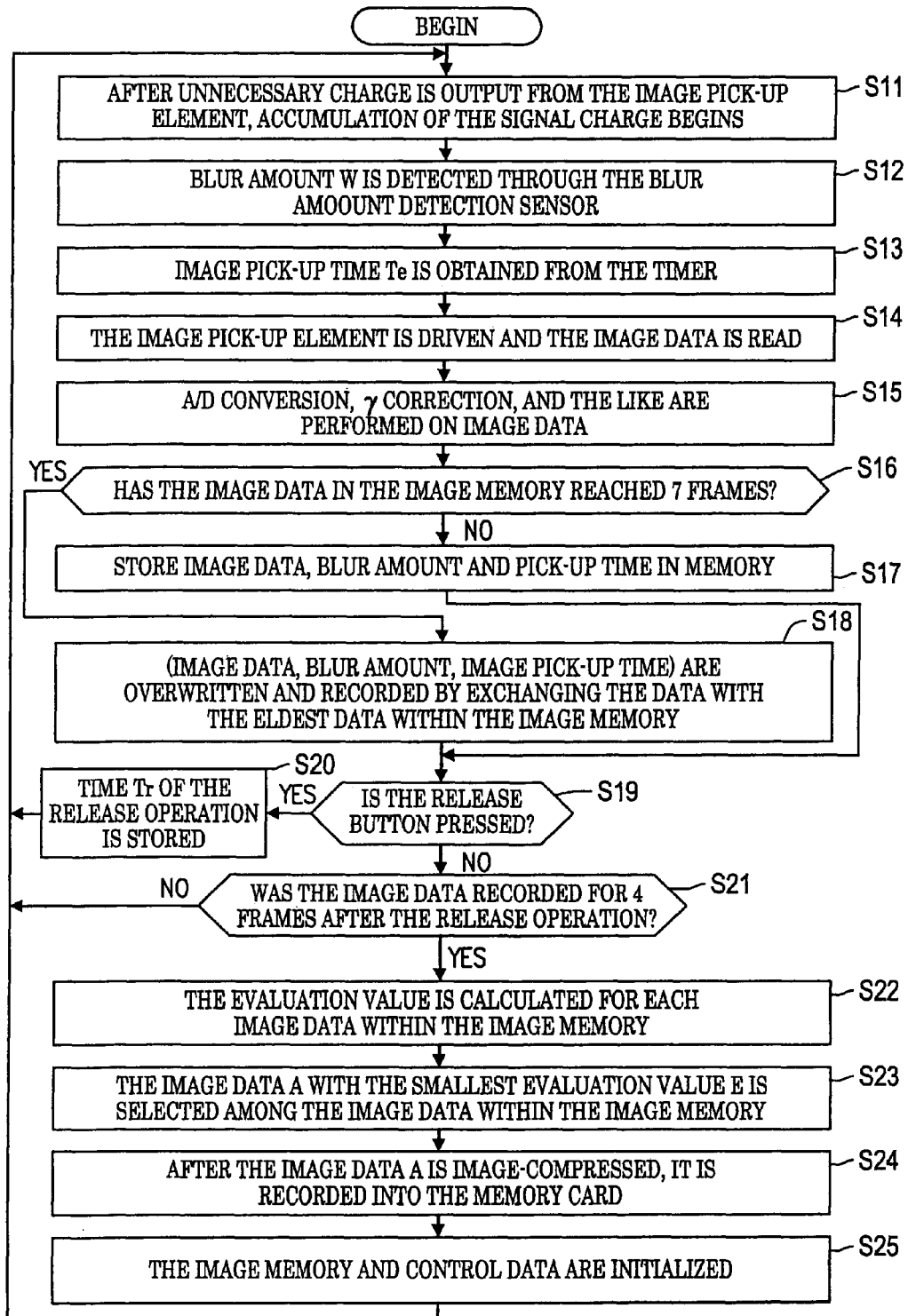
FIG. 7 is a flowchart which explains the operation of the second embodiment.

FIG. 7 is a flowchart which explains the operation of the second embodiment.

First of all, when the main power of the electronic camera 41 is turned on, the microprocessor 46 discharges unnecessary charges in the image pick-up element 43 via the CCD driving circuit 51. After thus discharging unnecessary charges, signal charges are accumulated in the image pick-up element 43 according to the brightness of the object which is projected on the light receiving face (S11 of FIG. 7).

During the accumulation period of the signal charge, the microprocessor 46 obtains the blur amount W1 in the vertical direction from the blur amount detecting sensor 49a. The blur amount W2 in the horizontal direction is obtained from the other blur amount detecting sensor 49b. The microprocessor 46 calculates the sum of the square values, the sum of the absolute values or the like for these blur amounts W1 and W2, and takes this as the overall blur amount of the electronic camera 41 (S12 of FIG. 7).

Next, the microprocessor 46 obtains the current time as the shooting time Te from the timer 52 (S13 of FIG. 7).

In this condition, when a predetermined accumulation time has passed, the microprocessor 46 reads out the image data from the image pick-up element 43 via the CCD driving circuit 51 (S14 of FIG. 7).

The image processor 44 temporarily stores this image data in the image memory 45 after performing A/D conversion, γ correction, and the like (S15 of FIG. 7). At this time, the microprocessor 46 stores the blur amount W and the shooting time Te in correlation with the image data (S17 of FIG. 7).

When the image data and the image memory 45 have already reached up to seven frames (S16 of FIG. 7), the newest data is written and recorded in place of the oldest data in the image memory 45 (S18 of FIG. 7).

Here, the microprocessor 46 evaluates whether the release button 50 is pressed (S19 of FIG. 7).

When the release button 50 is pressed (YES side of S19 of FIG. 7), the microprocessor 46 obtains the current time from the timer 52, and stores it as the time Tr of the release operation (S20 of FIG. 7).

The above-mentioned operations S11-20 are repeatedly executed until four frames of the image data after the release operation have been recorded (NO side of S21 of FIG. 7).

On the other hand, when four frames of the image data have been recorded after the release operation (YES side of S21 of FIG. 7), the microprocessor 46 executes the selection of the image data by the following procedure after suspending the imaging operation.

First of all, the microprocessor 46 calculates the evaluation value E by using the equation (1) for each image data in the image memory 45 (S22 of FIG. 7).

$$\text{Evaluation value } E = \alpha \cdot |Te - Tr| + \beta \cdot |W| \quad (1)$$

Here, the first item of the right side is an item relating to the release time lag, and the second item is an item relating to the blur amount W. Additionally, the coefficients α and β are to perform the weighting of these two items (for example, they are set as α=1, β=1 or the like).

The microprocessor 46 searches for the smallest value among individual evaluation values E, and finds the image data A which is related to the smallest evaluation value E (S23 of FIG. 7).

The microprocessor 46 reads out this image data A from the image memory 45 and image compresses the data. The microprocessor 46 saves the image-compressed image data A onto the memory card 48 via the image recording part 47 (S24 of FIG. 7). For the processing of the image compression, it is acceptable to complete it at steps S17 and S18 in FIG. 7 instead of performing it at this point.

Next, the microprocessor 46 returns the operation to step S11 after initializing the image memory 45 and the control data (S25 of FIG. 7).

According to the series of operations that are explained above, in the second embodiment, the image data in which the evaluation value E is the smallest is selected among the continuously imaged image data. Accordingly, it is possible to obtain the image data in which the hand shaking is smallest and in which the release time lag is smallest by taking the evaluation value E as the standard.

Additionally, since the selection of the image data is performed from among image data spanning from before to after the release operation, more adequate image data can be selected without being limited to the data obtained after performing the release operation.

In the above-mentioned second embodiment, the temporary storing of the image data is started by turning on the main power, but the present invention is not limited to this. For example, it is acceptable for the microprocessor 46 to detect the half-pressed state of the release button 50 and to start the temporary storing of the image data from the half-pressed point. In this kind of structure, because it is not necessary to always perform the temporary storing of the image data, it is possible to conserve electric power of the electric camera.

Next, another embodiment is explained.

The Third Embodiment

Figure 8:
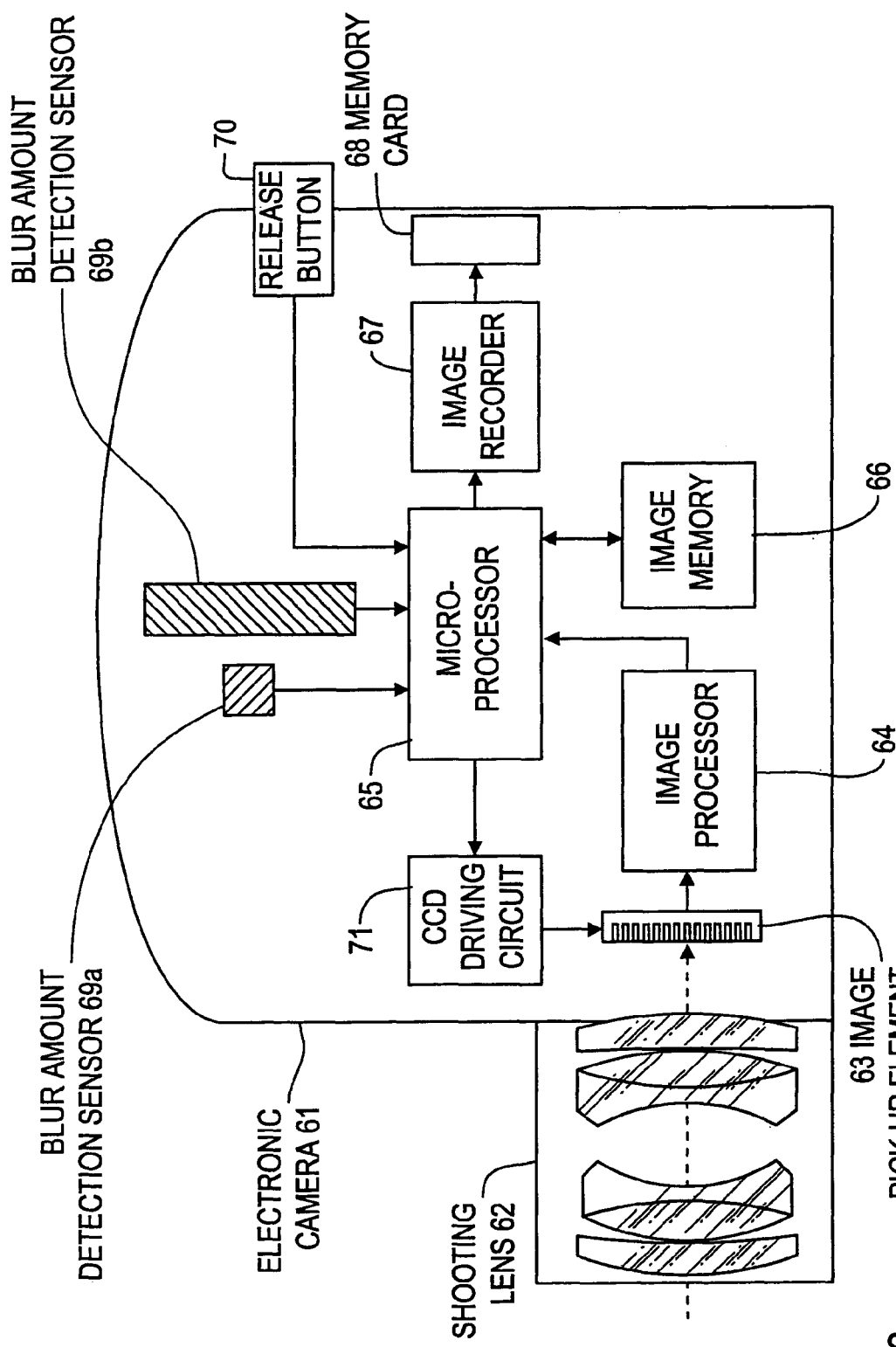
FIG. 8 is a block diagram which shows the third embodiment.

FIG. 8 is a block diagram showing the third embodiment.

In FIG. 8, a shooting lens 62 is fixed at a front surface of the electronic camera 61. The light-receiving face of an image pick-up element 63 is disposed on the image space side of the shooting lens 62.

The image output of the image pick-up element 63 is given to a microprocessor 65 through an image processor 64, which performs color signal processing, A/D conversion, γ correction, and the like. Furthermore, an image memory 66 is connected to the data bus of the microprocessor 65.

Additionally, a memory card 68 is detachably connected to the data output terminal of the microprocessor 65 through an image recorder 67.

Furthermore, the blur amount detection sensors 69a and 69b comprising an angular speed sensor such as a piezoelectric gyro are disposed inside of the case of the electronic camera 61. The outputs of the blur amount detection sensors 69a and 69b are respectively connected to A/D input terminals of the microprocessor 65.

In addition, a release button 70 is disposed on the top of the case of the electronic camera 61, and the switch output of the release button 70 is connected to the microprocessor 65.

Additionally, an electronic shutter control signal from the microprocessor 65 is given to a CCD driving circuit 71. The CCD driving circuit 71 forms a driving pulse in response to the control signal and gives it to the image pick-up element 63.

Furthermore, with respect to the corresponding relationships between the invention as set forth and the third embodiment, the image pick-up means 1 corresponds to the image pick-up element 63 and the CCD driving circuit 71, the shooting evaluation means 3 corresponds to the blur amount detection sensors 69a and 69b, the recording medium 10 corresponds to the image memory 66, the comparison means 11 corresponds to a "function to perform comparison between old and new blur amount" of the microprocessor 65, and the image overwriting means 12 corresponds to a "function to overwrite the image data to the image memory 66" of the microprocessor 65.

The following explains the operation of the third embodiment.

Figure 9:
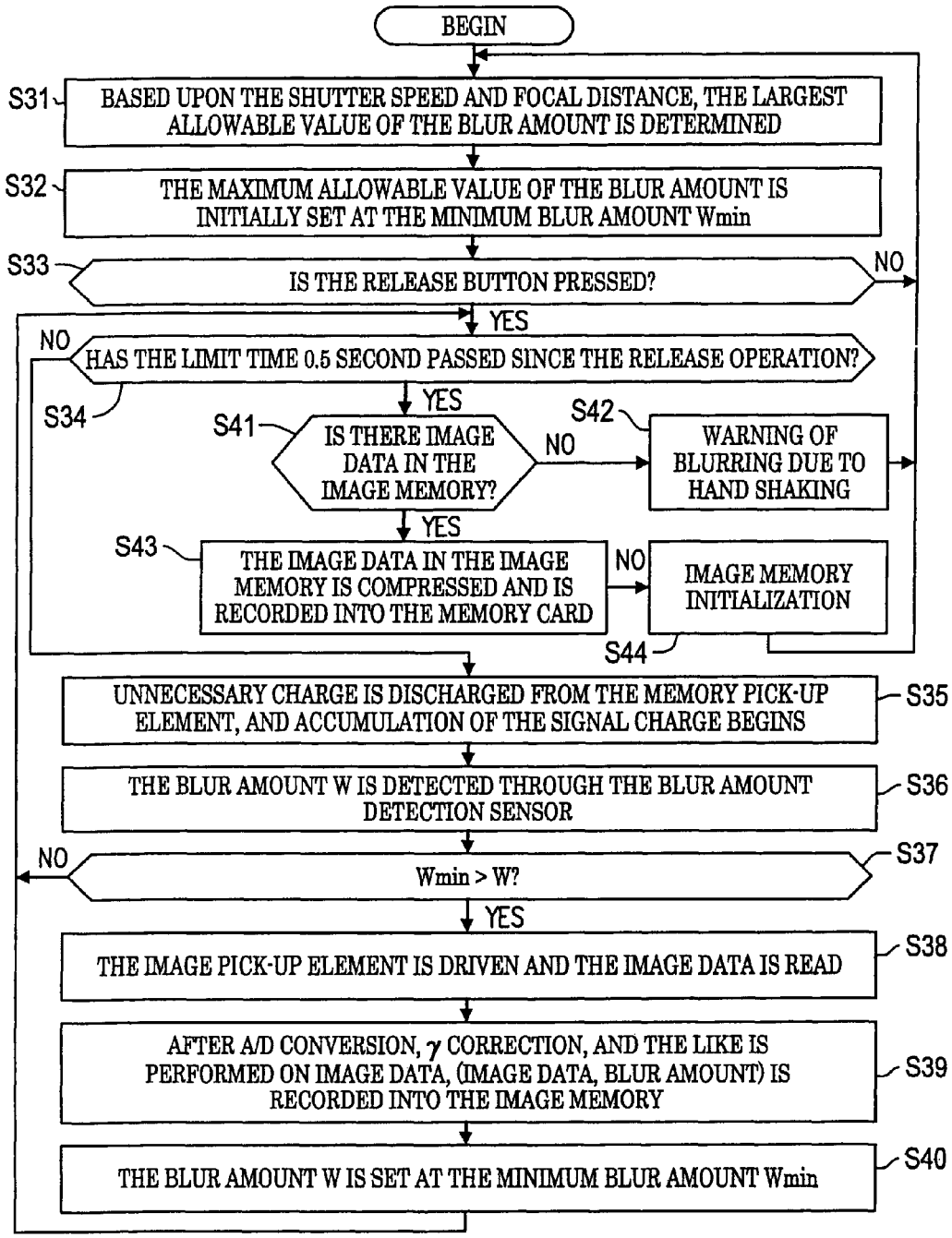
FIG. 9 is a flowchart which explains operation of the third embodiment.

FIG. 9 is a flow chart explaining the operation of the third embodiment.

First, when the main power is turned on to the electronic camera 61, the microprocessor 65 determines the maximum allowable value of the blur amount, based upon the current shutter speed and focal distance (FIG. 9 S31).

Next, the microprocessor 65 initially sets the maximum allowable value which was thus determined at the minimum blur amount $W_{min}$ (FIG. 9 S32).

The microprocessor 65 returns to step S31 until the release button 70 is pressed, and the above operation is regularly repeated (NO side of FIG. 9 S33).

Meanwhile, when the release button 70 is pressed (YES side of FIG. 9 S33), the microprocessor 65 repeatedly performs steps S35-40 as follows from the time of the release operation until 0.5 second has elapsed (FIG. 9 S34).

First, the microprocessor 65 temporarily discharges unnecessary charges from the image pick-up element 63 via the CCD driving circuit 71. After thus discharging unnecessary charges, the signal charge is accumulated in response to the brightness of the object image which is projected onto the light-receiving face in the image pick-up element 63 (FIG. 9 S35).

During the accumulation period of the signal charge, the microprocessor 65 obtains the blur amount W1 in the up-and-down direction from the blur amount detection sensor 69a. The blur amount W2 in the right-and-left direction is obtained from the other blur amount detection sensor 69b. The microprocessor 65 calculates the sum of the square values or the sum of the absolute values of the blur amounts W1 and W2, and this is defined as the overall blur amount W of the electronic camera 61 (FIG. 9 S36).

Here, the microprocessor 65 compares the size of the minimum blur amount $W_{min}$ and the blur amount W.

As a result of this type of comparison, when the blur amount W is larger (NO side of FIG. 9 S37), the microprocessor 65 does not read the image data from the image pick-up element 63 and returns the operation to step S34.

Furthermore, at the time of this determination, since the microprocessor 65 discharges unnecessary charge from the image pick-up element 63, it is acceptable to begin the following frame of the charge accumulation as soon as possible. By this type of operation, it is possible to increase the number of shooting frames per unit time by minimizing the waste of accumulation time.

Meanwhile, when the blur amount W is smaller (YES side of FIG. 9 S37) the microprocessor 65 reads the image data from the image pick-up element 63 after a predetermined accumulation time elapses (FIG. 9 S38).

The microprocessor 65 takes in the image data through the image processor 64 and is overwritten and recorded in the image memory 66 (step S39).

Along with this type of overwriting recording, after the microprocessor 65 sets the current blur amount W at the minimum blur amount $W_{min}$ (step S40), the operation returns to step S34.

After the above-mentioned series of operations S34-40 are repeatedly performed until the limit time 0.5 seconds has elapsed since the release operation, the microprocessor 65 moves the operation to step S41.

By the operation up to the present, the image data with the smallest blur amount W among the image data which is imaged in 0.5 seconds from the release operation is recorded in the image memory 66.

In this type of case (YES side of FIG. 9 S41), after the microprocessor 65 image-compresses the residual image data within the image memory 66, the data is saved on the memory card 68 through the image recorder 67 (FIG. 9 S43). In addition, with respect to the image compression processing, instead of performing the processing here, it is acceptable to have the processing performed in step S39 shown in FIG. 9.

After saving of the image data is completed, the microprocessor 65 returns the operation to step S31 after the image data within the image memory 66 is erased in preparation for the following shooting operation (FIG. 9 S44).

Furthermore, when the blur amount W does not fall under the largest allowable value of the blur amount even one time, the image data cannot be recorded in the image memory 66 at all. Thus, when no image data exists in the image memory 66 (NO side of FIG. 9 S41), the microprocessor 65 determines that blurring due to hand shaking was too much, so the operation returns to step S31 after processing of the "warning of blurring due to hand shaking" is performed (FIG. 9 S42).

By the operation which was explained above, in the third embodiment, image data with much less blur amount is saved in the image memory 66. Therefore, it is possible to obtain image data with less blurring due to hand shaking without using the conventional correction mechanism for blurring due to hand shaking.

Furthermore, the image data is successively overwritten and recorded in the image memory 66, so the capacity to store at least one frame of image data is sufficient.

Additionally, in the third embodiment, image data with less blur amount is saved in the image memory 66 based upon the comparison of the blur amount, but the invention is not limited to this. It is also acceptable to select the image data which will be left in the image memory 66 based upon an evaluation value including the evaluation items or the like.

Furthermore, in the third embodiment, when the blur amount W does not fall below the "largest allowable value of the blur amount", the image data is not recorded at all, but the invention is not limited to this. For example, the first image data or the like can be temporarily recorded, and after that, the image data can be updated every time the blur amount W falls below the largest allowable value. In this type of structure, the image data with the smallest blur amount W is eventually recorded.

Additionally, in the first through third embodiments, based upon the blur amount or the evaluation value, only one frame of image data is saved, but the invention is not limited to this. For example, it is also acceptable to save a predetermined number of image data beginning from the highest ranking evaluated position based upon the blur amount or the evaluation value. In this type of structure, the operator can later select the image data with the best "shutter chance" among a specified number of image data.

The following explains another embodiment.

Fourth Embodiment

Figure 10:
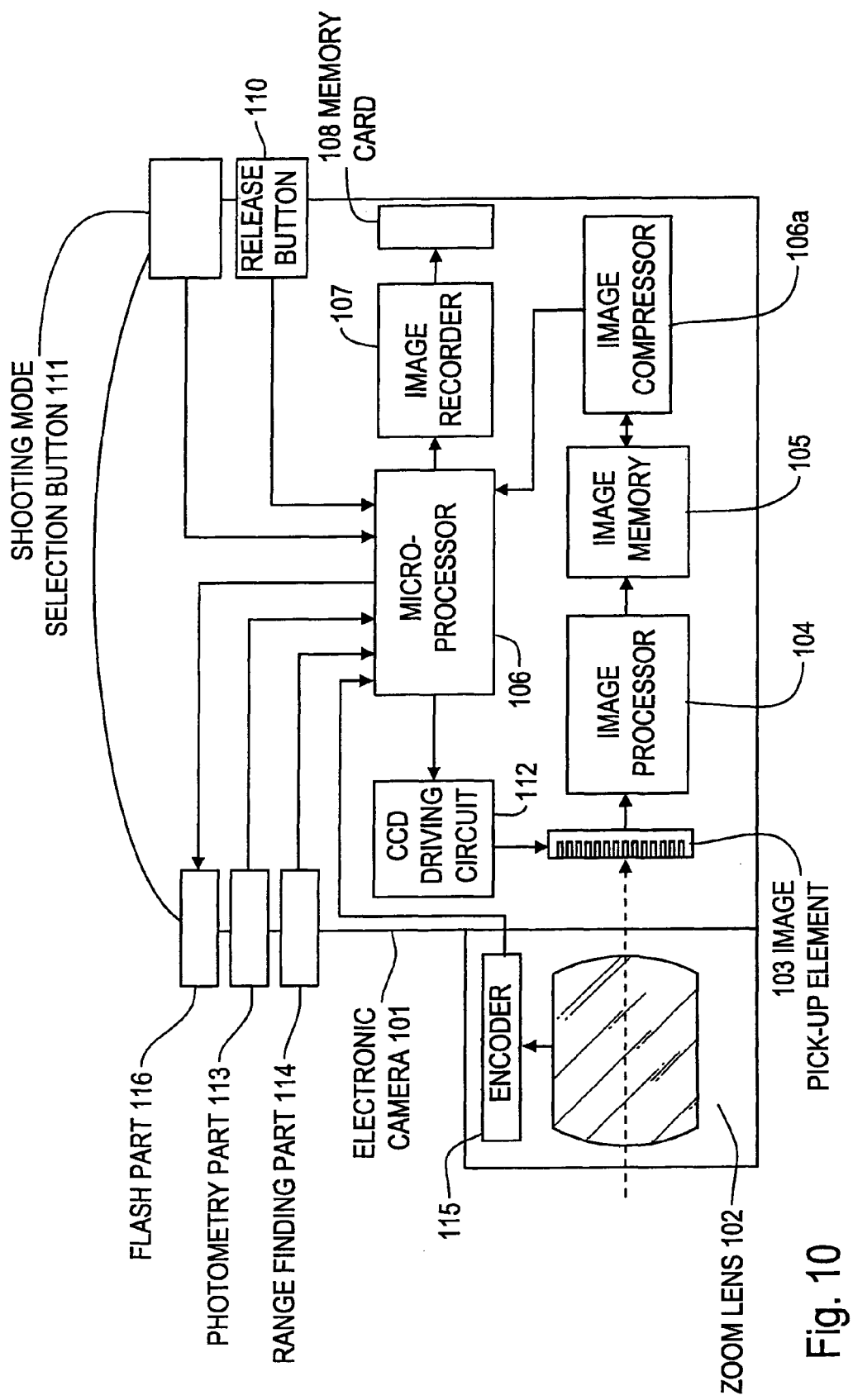
FIG. 10 is a block diagram which shows the fourth embodiment.

FIG. 10 is a block diagram showing the fourth embodiment.

In FIG. 10, a zoom lens 102 is fixed at the front of an electronic camera 101. The light-receiving face of an image pick-up element 103 is disposed on the image space side of the zoom lens 102.

The image output from the image pick-up element 103 is connected to an image compressor 106*a* via the image processor 104 which performs color signal processing, A/D conversion, γ correction and the like and the image memory 105. The output of the image compressor 106*a* is connected to a microprocessor 106.

Furthermore, a memory card 108 is detachably connected to the microprocessor 106 via an image recorder 107.

Furthermore, a release button 110 and a shooting mode selection button 111 are disposed on the housing of the electronic camera 101, and the switch outputs of these operation parts are connected to the microprocessor 106.

Additionally, an electronic shutter control signal from the microprocessor 106 is given to the CCD driving circuit 112. The CCD driving circuit 112 forms a driving pulse in response to the control signal and gives the driving pulse to the image pick-up element 103.

Furthermore, a photometry part 113 to measure the object brightness, a range finding part 114 to measure the object distance, an encoder 115 to detect the focal distance from the lens position, and a flash part (so-called strobe) 116 are disposed on the electronic camera 101 and are respectively connected to the microprocessor 106.

Furthermore, with respect to the corresponding relationships between the invention as set forth and the fourth embodiment, the image pick-up means 1 corresponds to the image pick-up element 103, the CCD driving circuit 112, and the zoom lens 102, the temporary memory means 2 corresponds to the image memory 105, the shooting evaluation means 3 corresponds to a "function to convert the image data to a spatial frequency component" of the image compressor 106*a*, the still image selection means 4 corresponds to a "function to select image data based upon the spatial frequency component" of the microprocessor 106, and the image saving means 5 corresponds to the image recorder 107 and the memory card 108.

The following explains the operation of the fourth embodiment.

Figure 11:
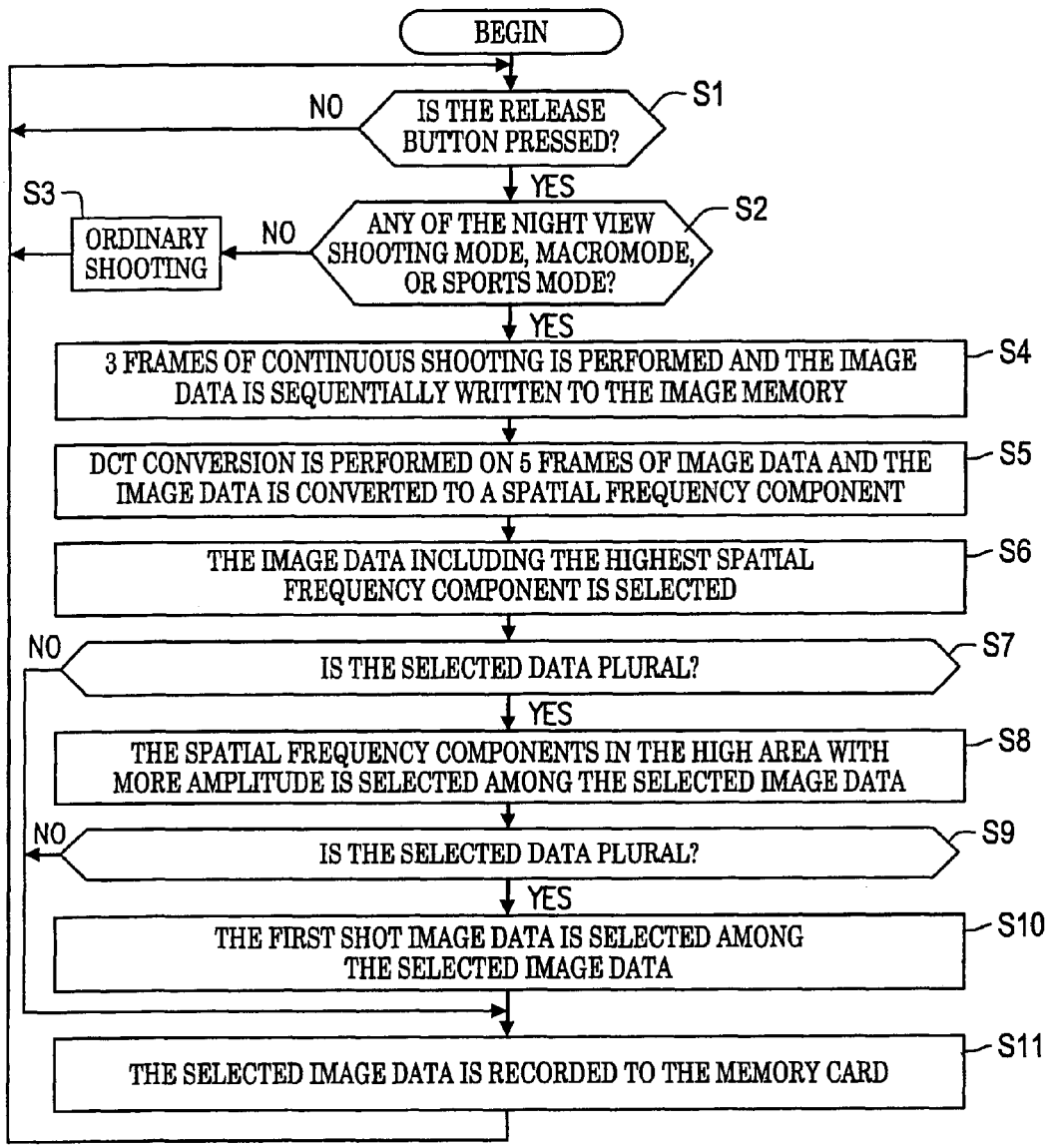
FIG. 11 is a flowchart which explains the operation of the fourth embodiment.

FIG. 11 is a flow chart explaining the operation of the fourth embodiment.

First of all, when the main power is turned on to the electronic camera 101, the microprocessor 106 waits until the release button 110 is pressed (NO side of FIG. 11 S1).

Here, when the release button 110 is pressed (YES side of FIG. 11 S1), the microprocessor 106 determines a current shooting mode (FIG. 11 S2).

If the current shooting mode is not any of the following cases (1)-(3), the microprocessor 106 returns the operation to step S1 after an ordinary shooting (shooting that images and records one frame) is performed (FIG. 11 S3).

(1) Night view shooting mode—a mode which can cut the flash emitted light, adjust the focus at infinite, and expose for a long period of time.

(2) Macro mode—a mode which sets the focus of the lens at the macro area and performs close-up shooting.

(3) Sports mode—a mode which sets the exposure time as short as possible and shoots an object which moves at high speed.

Meanwhile, when the current shooting mode is any of these shooting modes, there is a particularly high possibility of blurring due to hand shaking, movement of the object, and/or misfocus, so the microprocessor 106 performs the countermeasure operations of step S4 and after.

First of all, the microprocessor 106 instructs a plurality of sequential shootings (3 frames as an example here) to the CCD driving circuit 112. The CCD driving circuit 112 consecutively reads three frames of image data from the image pick-up element 103. The three frames of the image data are temporarily stored in the image memory 105 after color signal processing, γ correction, and the like is performed by the image processor 104 (FIG. 11 S4).

Next, the microprocessor 106 instructs DCT conversion (discrete cosine transformation) to the image compressor 106a. The image compressor 106a takes in a specified area of the screen (for example, the center of the screen) and performs DCT conversion with respect to three frames of image data within the image memory 105 (FIG. 11 S5).

The microprocessor 106 takes in the spatial frequency component after the DCT conversion and selects the image data including the highest spatial frequency component among the three frames (FIG. 11 S6).

Here, when there is only one piece of selected image data (NO side of FIG. 11 S7), the microprocessor 106 moves the operation to step S11.

Meanwhile, when a plurality of selected image data are available (YES side of FIG. 11 S7), the microprocessor 106 selects the spatial frequency component with the largest amplitude in the high area among the selected data (FIG. 11 S8).

Here, when there is one piece of selected image data (NO side of FIG. 11 S9), the microprocessor 106 moves the operation to step S11.

Meanwhile, when there are still a plurality of selected image data (YES side of FIG. 11, S9), the microprocessor 106 selects the first shot data among the selected image data (FIG. 11 S10).

After the image data is thus narrowed down to one, the microprocessor 106 image-compresses the image data via the image compressor 106a, and the image data is recorded to the memory card 108 (FIG. 11 S11).

By the operation which was explained above, in the fourth embodiment, the image data with the most ample spatial frequency component in the high area is selected among the image data which has been continuously imaged and is recorded. Therefore, it is possible to select image data in which blurring due to hand shaking, movement of the object, misfocus, or the like is appropriately small.

Furthermore, in the fourth embodiment, by using conversion such as DCT conversion, the spatial frequency component of the image data is accurately determined, but the present invention is not limited to this. For example, it is acceptable to easily determine the spatial frequency component by using a well-known spatial frequency filter (e.g., a high pass filter which takes the difference between the adjacent pixels), contrast detection, or the like.

The following explains another embodiment.

Fifth Embodiment

Additionally, the structure of the fifth embodiment is virtually the same as the fourth embodiment (FIG. 10), so the structural explanation is omitted here.

Figure 12:
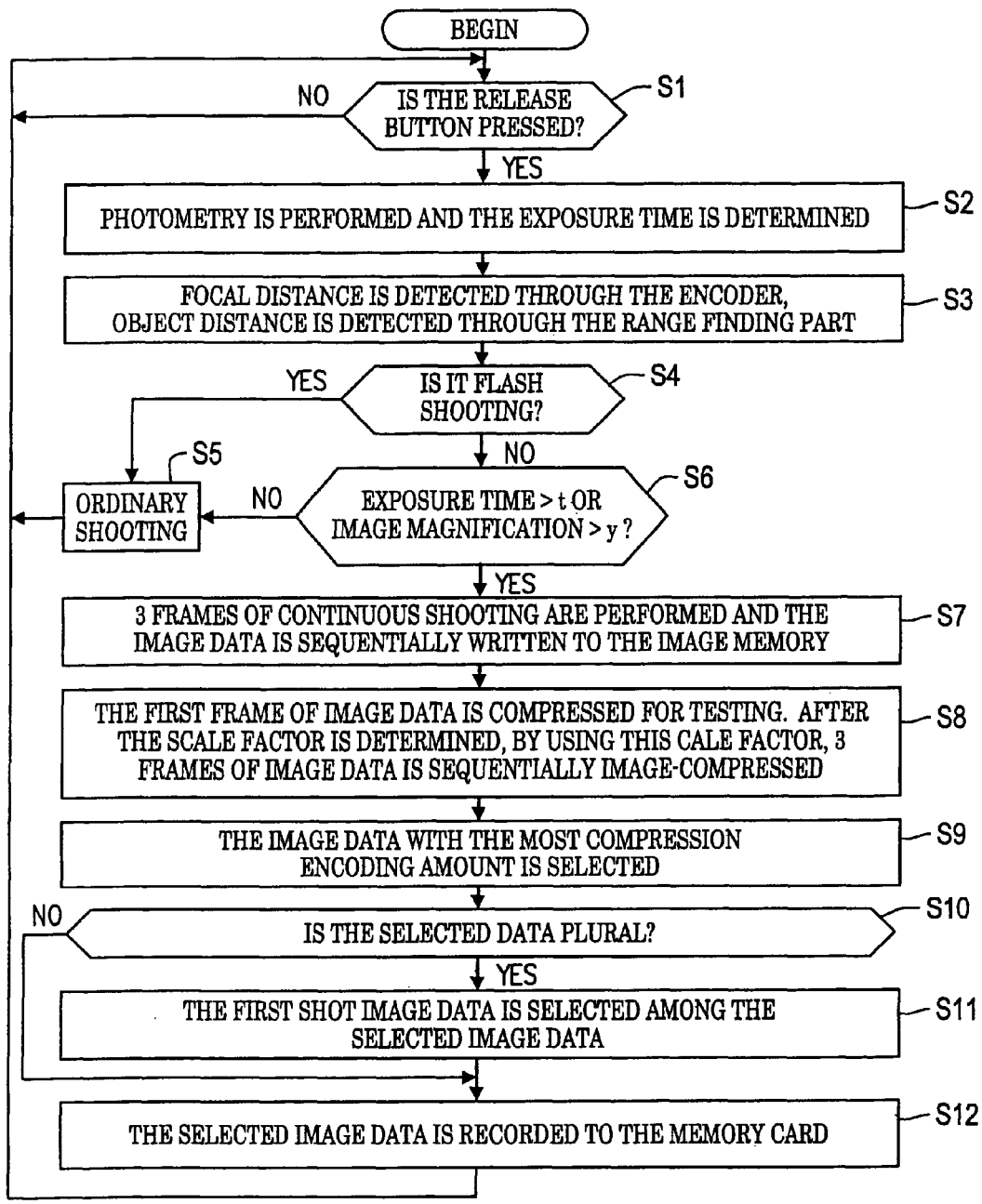
FIG. 12 is a flowchart which explains the operation of the fifth embodiment.
Figure 13:
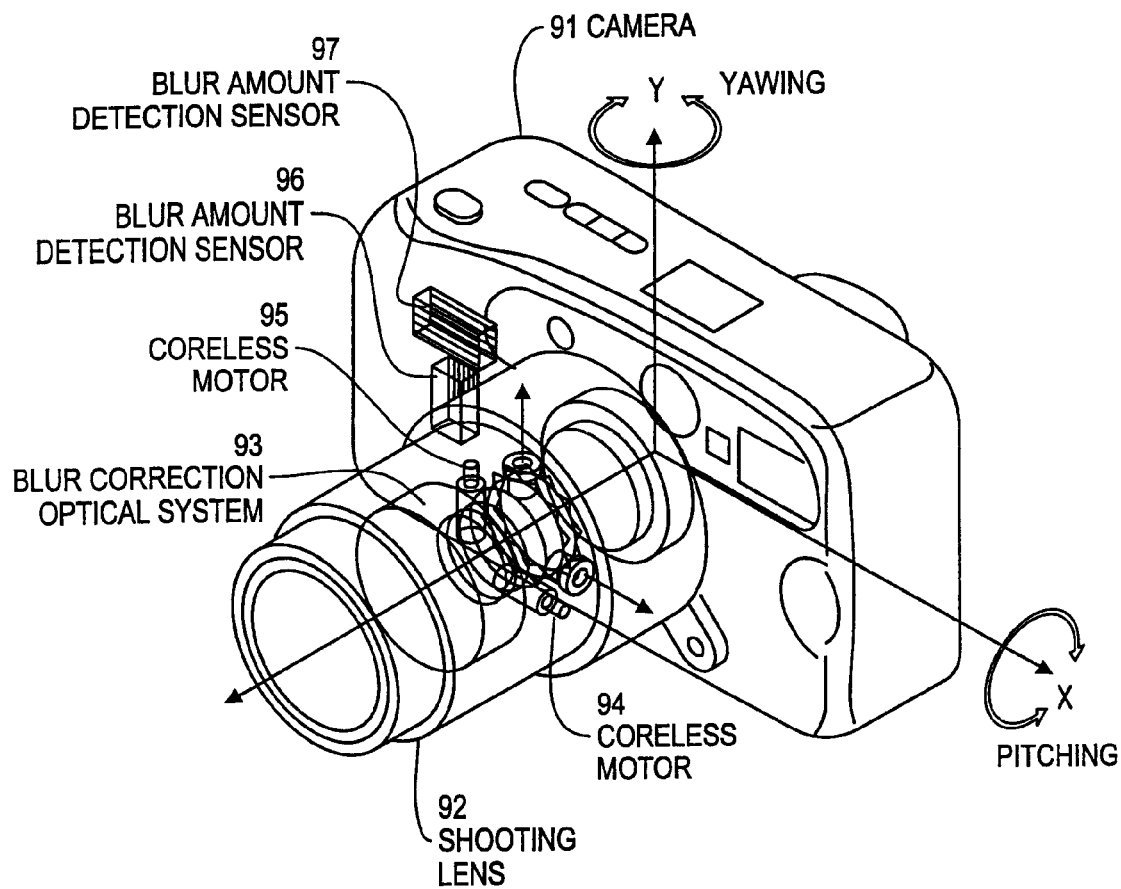
FIG. 13 is a diagram which shows a conventional example of a camera with a hand shaking correction mechanism.

FIG. 12 is a flow chart explaining the operation of the fifth embodiment.

The following explains the operation of the fifth embodiment in accordance with FIG. 12.

First, when the main power is turned on to the electronic camera 101, the microprocessor 106 waits until the release button 110 is pressed (NO side of FIG. 12, S1).

Here, when the release button 110 is pressed (YES side of FIG. 12 S1), the microprocessor 106 measures the object brightness through the photometry part 113 and determines the exposure time to obtain the appropriate exposure (FIG. 12 S2).

Next, the microprocessor 106 detects the focal distance of the zoom lens 102 through the encoder 115. Furthermore, the microprocessor 106 detects the object distance through the range finding part 114 (FIG. 12 S3).

Here, the microprocessor 106 determines whether the current mode setting is the flash shooting mode (FIG. 12 S4). In the case of the flash shooting mode, the possibility of blurring due to hand shaking or movement of the object is lower, so the microprocessor 106 returns the operation to step S1 after ordinary shooting (shooting to image and record one frame) is performed (FIG. 12 S5).

Meanwhile, when the current mode setting is other than the flash shooting mode, the microprocessor 106 performs the following condition determinations (1) and (2).

(1) Whether the exposure time is longer than a specified time τ.

(2) Whether the image magnification (approximately equal to focal distance/object distance) is larger than a specified magnification γ.

When neither of these conditions are established (NO side of FIG. 12 S6), the microprocessor 106 determines that there is little possibility of blurring due to hand shaking or movement of the object, and the operation is returned to step S1 after the ordinary shooting is performed (FIG. 12 S5).

Meanwhile, when either of these conditions is established (YES side of FIG. 12 S6), the microprocessor 106 performs the countermeasure operation of step S7 and after.

First, the microprocessor 106 instructs continuous shooting of a plurality of frames (3 frames as an example here) to the CCD driving circuit 112. The CCD driving circuit 112 sequentially reads three frames of image data from the image pick-up element 103. The three frames of image data are temporarily stored in the image memory 105 through the image processor 104 after color signal processing, γ correction, and the like is performed (FIG. 12 S7).

Next, the microprocessor 106 instructs image compression to the image compressor 106a. The image compressor 106a compresses one frame of image data for testing and determines an appropriate scale factor (a well-known parameter value to govern the condition of quantization in the image compression) in order to approach a desired compression encoding amount. The image compressor 106a uniformly uses the scale factor value and sequentially image-compresses three frames of image data (FIG. 12 S8).

Here, the microprocessor 106 compares the sizes of the encoding amounts after compression (compressed encoding amounts) of the three frames of image data and selects the image data with the largest compressed encoding amount (FIG. 12 S9).

Here, when there is one piece of selected image data (NO side of FIG. 12 S10), the microprocessor 106 moves the operation to step S12.

Meanwhile, when there are a plurality of selected image data (YES side of FIG. 12 S10), the microprocessor 106 selects the data which was first shot among the selected image data (FIG. 12 S11).

After the image data is thus narrowed down to one, the microprocessor 106 records the selected image data (already compressed) to the memory card 108 (FIG. 12 S12).

By the operation which was explained above, in the fifth embodiment, the image data with the largest compressed encoding amount is selected among the image data which has been continuously imaged and is recorded to the memory card 108. Therefore, the image with generally little blurring due to hand shaking, movement of the object, and misfocus and with the most ample spatial frequency component in the high area can be recorded onto the memory card 108.

Furthermore, in the fifth embodiment which was described above, when the image magnification is larger than the specified magnification γ, it is in a mode that selects a good image (an image in a good shooting state), but the invention is not limited to this. For example, it is acceptable to enter a mode which selects a good image when the focal distance is longer than the specified value.

Furthermore, in the fifth embodiment which was described above, three frames of image data are image-compressed over the entire screen, but the present invention is not limited to this. For example, it is also acceptable to extract only a specified area (for example, the center of the screen) on the screen from the three frames of image data, perform the image compression, and obtain the compressed encoding amount for evaluation. In this type of operation, the comparison of the spatial frequency component is performed limited to the specified area. Therefore, even if it is in a shooting condition where the background might be blurry such as zoom shooting or wide-angle shooting, it is possible to accurately select clear image data within the specified area. Furthermore, when the compressed encoding amount for evaluation is obtained, image compression for only the specified area is sufficient, so it is possible to significantly shorten the processing time to obtain the compressed encoding amount for evaluation.

In addition, in the fifth embodiment which was described above, after three frames of continuous shooting are all completed, three frames of image compression begins, but the present invention is not limited to this. For example, it is acceptable to increase the number of shooting per unit time by simultaneously performing the previous frame of image compression and the following frame of image pick-up operation. Particularly, in this type of operation, it is possible to simultaneously perform the image pick-up operation along with the old and new comparison of the compressed encoding amount, so it is possible to structure an electronic camera to overwrite and record better image data such as the present invention.

Furthermore, in the first through fifth embodiments which were described above, the case is explained in which one good image is saved, but it is possible to apply the present invention to a case in which a plurality of good images are saved. For example, in the case of exposure bracketing (a mode that shoots several times while changing the exposure condition), the operation to save one good image under the same exposure condition can be repeated while changing the exposure condition.

Furthermore, in the first through fifth embodiments which were described above, the display function of the electronic camera is not particularly explained, but it is possible to perform various displays related to the present invention. For example, a mode display such as "a mode to select an image in response to a good/bad evaluation of the shooting state" may be performed within the view finder, and/or on the monitor screen of the electronic camera, and/or the number of the current sample of image data and/or the number of remaining samples can be displayed by using pictures, characters, or the like. With this type of structure, it is possible to inform the photographer of the operation state of the electronic camera in detail.

In addition, the result of a good/bad evaluation of the shooting state (size of the blur amount or the like) can be displayed by using pictures, characters, or the like. At this time, along with the display of a good/bad evaluation, it is acceptable to display (for example, thumbnail display) the image data which is temporarily stored. With this type of structure, the photographer considers the image display and the display of a good/bad evaluation and can appropriately select desired image data.

Furthermore, when the good/bad evaluation in a shooting state is less than a threshold, a warning display (including a warning or the like) can be performed, and/or a display to inform that the good/bad evaluation is the maximum (including a warning or the like) can be performed. In this type of structure, the photographer is informed of the goodness or badness of the shooting state, so it is possible to lead the shooting to a better shooting state.

Furthermore, in the above-mentioned embodiment, the electronic camera of a unitary structure is explained, but the present invention is not limited to this. For example, it is possible to apply the present invention to an electronic camera which is separately structured by an image pick-up unit and information equipment (computer or the like).

As a specific example of the above case, the operations can be divided into: (1) The image data which is continuously imaged in the image pick-up unit side is temporarily stored. (2) An image is selected and saved among a series of image data in response to the good/bad evaluation of the shooting state by the program execution of the computer side.

Furthermore, when the present invention is applied to a computer, it is acceptable to independently perform "the image selection program to select and save an image among a series of image data in response to the good/bad evaluation of the shooting state" on the computer side. Needless to say, in this type of structure, there is a disadvantage such that the collection of information of the shooting state from the camera side is insufficient, but it is possible to perform the operation as a single computer if the good/bad evaluation of the spatial frequency component is available, so it is possible to obtain almost the same operation effect as the structure in the present invention.

In the invention, the image data which has been imaged during the period of time when the shooting state is the best is selected from among the image data which has been continuously imaged. Therefore, it is possible to obtain image data in a good shooting state without using the conventional correction mechanism for blurring due to hand shaking.

Therefore, it is possible to omit the optical system for the conventional correction of blurring due to hand shaking, and size reduction and weight reduction of the shooting lens can be improved.

Furthermore, it is possible to omit the space to dispose the optical system for the correction of blurring due to hand shaking from the shooting lens. As a result, the degree of freedom becomes high in terms of the optical design, and the aberration performance and the like of the shooting lens can be optimized without any difficulty.

Furthermore, the slight internal reflection which occurs in the optical system for the conventional correction of blurring due to hand shaking can be solved. Therefore, the flare during backlight shooting can be decreased and the camera image quality can be significantly improved.

Furthermore, it is possible to omit the driving mechanism for the conventional correction for blurring due to hand shaking or the like, and electricity conservation in the electronic camera can be improved. Additionally, problems such as noise and vibration from the driving mechanism for the correction for blurring due to hand shaking can be solved.

Furthermore, the selection processing of the image data is performed after the shooting is completed, so there are advantages such that the processing load during the shooting period does not significantly increase and the number of shooting frames per time unit does not decrease much.

In the invention, the temporary memory means begins the temporary storage of the image data after the release operation of the electronic camera. Because of this, it is possible to stop the image pick-up operation prior to the release operation. Accordingly, electricity conservation for the electronic camera can be improved.

In the invention, the temporary memory means maintains the image data from before to after the release operation. Accordingly, not limited to the image data after the release operation, it is possible to accurately select the image data in a much better shooting state from the period spanning from before to after the release operation.

Furthermore, blurring due to hand shaking has not yet occurred immediately before the release operation in accordance with the release operation. Therefore, when blurring due to hand shaking is evaluated as a shooting state, by adding the period immediately before the release operation to the sampling range of the image data, it is possible to select the image data with extremely little blurring due to hand shaking at high probability.

Furthermore, the sampling range of the image data spans from before to after the release operation, so the worst value of the release time lag (equivalent to the edge point of the sampling range of the image data) can be decreased by almost half compared to the case when the sampling range of the same time length begins with the release operation.

In the invention, the temporary memory means and the image saving means use the same memory mechanism. Therefore, there is no need for a memory mechanism for only the temporary memory means, and it is possible to simplify the construction of the electronic camera.

In the invention, the image data which is continuously imaged is differentially compressed and then is temporarily stored. Therefore, it is possible to keep the encoding amount of the image data small and to minimize the memory capacity of the temporary memory means.

Furthermore, if the memory capacity of the temporary memory means does not change, it is possible to increase the number of samplings of the image data which can be temporarily stored. In this case, because the selection is performed among more image data, the possibility of obtaining image data in a much better shooting state can be significantly higher.

In the invention, image data in a much better shooting state is selectively retained among the image data which is continuously imaged. Therefore, it is possible to obtain image data in a good shooting state without using the conventional correction mechanism for hand shaking or the like.

Additionally, image data is overwritten and recorded in the memory medium, so it is sufficient to have merely enough capacity to store at least one frame of image data. Therefore, it is not necessary to have a large capacity memory medium for temporary storage, and it is possible to simplify the construction of the electronic camera.

In the invention, as a good/bad evaluation of the shooting state, the blur amount of the image pick-up means is detected. As a result, it is possible to select and save the image data with appropriately little hand shaking.

In the invention, as a standard of a good/bad evaluation of the shooting state, the spatial frequency component of the image data is used. As a result, it is possible to select and save image data with appropriately little overall blurring due to hand shaking, movement of the object, and misfocus.

Particularly, this type of good/bad evaluation of the spatial frequency component can be performed by a calculation, so a piezoelectric gyro or the like for the detection of blurring due to hand shaking is not needed. Therefore, even if the invention is used, it is not particularly necessary to add a sensor part or the like to the conventional electronic camera, and it is possible to obtain the effects of the present invention with a simple structure at low cost.

Furthermore, particularly, with respect to an object showing unpredictable movement such as a flower swayed by the wind, it is extremely difficult to completely prevent misfocus by ordinary AF (autofocus) shooting only. However, in the invention, even under a bad condition like this, based upon the spatial frequency component, it is possible to reliably select and save the image data with little misfocus.

In the invention, the high-area component amount of the spatial frequency is determined by the compressed encoding amount. This type of value of the compressed encoding amount can be obtained by the result of conventional image compression processing or the like, so it is not necessary to add a particular calculation processing, and it is possible to decrease the processing time and the calculation processing amount.

In the invention, for the good/bad evaluation of the shooting state, the release time lag is used. As a result, it is possible to select and save good image data with comparatively little release time lag.

Especially, in a state where temporary storage of the camera image has been performed since before the execution of the release operation, when image data with little release time lag is selected, it is possible to obtain image data where the release time lag is extremely close to 0.

What is claimed is:

1. An electronic camera comprising:
    image pick-up means for continuously imaging an object;
    a memory medium that stores image data;
    shooting evaluation means that obtains one evaluation relating to a blur amount of the electronic camera before an operation of a release button for recording the image data, obtains the evaluation for each image data continuously shot by the image pick-up means according to the operation of the release button for recording the image data, and evaluates a good or bad shooting state for each frame by the evaluation;
    comparison means for comparing the evaluation of said shooting evaluation means concerning the image data within said memory medium with the evaluation of said shooting evaluation means concerning new image data from said image pick-up means;
    image overwriting means for overwriting and recording an entire frame of the new image data to said memory medium when the evaluation of the new image data is higher than the evaluation of the image data within the memory medium in accordance with a comparison result of said comparison means; and
    image recording means for recording, on a memory card, the image data that is recorded on the memory medium at a point in time at which the comparing the evaluation for each frame of the image data continuously shot by the image pick-up means has ended.

2. The electronic camera as set forth in claim 1,
    wherein, as at least one of the good or bad evaluations of said shooting state, said shooting evaluation means detects a blurring amount and/or a misfocus amount of said image pick-up means.

3. The electronic camera as set forth in claim 2,
    wherein, as at least one of the good or bad evaluations of said shooting state, said shooting evaluation means determines a spatial frequency component of said image data.

4. The electronic camera as set forth in claim 3,
wherein said shooting evaluation means determines a high-area component amount of the spatial frequency, based upon a compressed encoding amount of said image data.

5. The electronic camera as set forth in claim 4,
wherein, as at least one of the good or bad evaluations of said shooting state, said shooting evaluation means determines a release time lag, which is a time difference between a release operation of the electronic camera and an image pick-up time of the image data.

6. An electronic camera comprising a controller that:
obtains one evaluation relating to a blur amount of the electronic camera before an operation of a release button for recording image data, obtains the evaluation based on a spatial frequency component for each image data continuously shot according to the operation of the release button for recording the image data, and evaluates a good or bad shooting state for each frame by the evaluation;
compares the evaluation concerning the image data within a memory medium with the evaluation concerning new image data;
overwrites and records an entire frame of the new image data to said memory medium when the evaluation of the new image data is higher than the evaluation of the image data within the memory medium in accordance with a comparison result of the evaluation concerning the image data within the memory medium with the evaluation concerning the new image data; and
records, on a memory card, the image data that is recorded on the memory medium at a point in time at which comparing the evaluation for each frame of the image data has ended.

7. An electronic camera comprising:

image pick-up means for continuously imaging an object;

a memory medium that stores image data;

shooting evaluation means that obtains a first evaluation relating to a blur amount of the electronic camera before recording temporarily the image data, obtains a second evaluation relating to a blur amount for each image data continuously shot by the image pick-up means after setting the first evaluation, and evaluates a good or bad shooting state for each frame;

comparison means for comparing the first evaluation of said shooting evaluation means concerning the image data within said memory medium with the second evaluation of said shooting evaluation means concerning new image data from said image pick-up means;

image temporary recording means for recording temporarily an entire frame of the new image data to said memory medium when the second evaluation of the new image data is higher than the first evaluation of the image data within the memory medium in accordance with a comparison result of said comparison means; and image recording means for recording, on a memory card, the image data that is recorded temporarily by the image temporary recording means on the memory medium at a point in time at which the comparing the first evaluation with the second evaluation for each frame of the image data continuously shot by the image pick-up means has ended.

* * * * *